United States Patent [19]

Yeung

[11] Patent Number: 4,783,870

[45] Date of Patent: Nov. 15, 1988

[54] COMPACT DISK CLEANER

[75] Inventor: Ghoi K. Yeung, Hong Kong, Hong Kong

[73] Assignee: Recoton Corporation, Long Island City, N.Y.

[21] Appl. No.: 897,289

[22] Filed: Aug. 18, 1986

Related U.S. Application Data

[63] Continuation-in-part of Ser. No. 745,672, Jun. 17, 1985, Pat. No. 4,654,917.

[51] Int. Cl.[4] .......................... B08B 11/02; G11B 3/58
[52] U.S. Cl. .................... 15/97 R; 15/21 C; B08B/11/02; G11B/3/58
[58] Field of Search ................... 15/21 R, 21 C, 97 R; 369/72; 134/6; 360/137

[56] References Cited

U.S. PATENT DOCUMENTS

| | | | |
|---|---|---|---|
| 2,563,701 | 8/1951 | Ajero | 369/72 |
| 3,421,168 | 1/1969 | Bartel | 15/21 R |
| 4,068,251 | 1/1978 | Schroter et al. | 15/21 C |
| 4,100,643 | 7/1978 | Horian et al. | 15/97 R |
| 4,556,433 | 12/1985 | Clausen | 15/97 R X |
| 4,561,142 | 12/1985 | Mischenko et al. | 15/97 R |
| 4,569,098 | 2/1986 | Kawabe | 369/72 X |

FOREIGN PATENT DOCUMENTS 666242 2/1952 United Kingdom ............... 15/97 R Primary Examiner—Edward L. Roberts
Attorney, Agent, or Firm—Curtis, Morris & Safford

[57] ABSTRACT

Cleaning apparatus for a compact disc comprises a housing having a hingedly coupled base and cover; a drive wheel disposed in the base of the housing rotatably supporting the compact disc and having a first axis of rotation, a rotatable carrier fixed to the cover and having a second axis of rotation and further having a cleaning pad fastened thereto which is adapted to contact the surface of the compact disc to clean the same, and a drive element coupled to the drive wheel and the carrier for rotating the compact disc and cleaning pad at approximately the same speed.

7 Claims, 2 Drawing Sheets

COMPACT DISK CLEANER

BACKGROUND OF THE INVENTION

This is a continuation-in-part of U.S. patent application Ser. No. 745,672 filed June 17, 1985, now U.S. Pat. No. 4,654,917.

This invention relates to a record cleaner and, more particularly, to a compact disc cleaner that provides good mechanical cleaning of a compact disc.

The recent introduction of the so-called compact disc has resulted in a marked improvement in the quality of reproduced sound, such as music, from what broadly may be called a phonograph record. A conventional compact disc is provided with a surface having "pits" and "lands" arranged in concentric circular tracks, these pits and lands representing digital information that, in turn, constitutes a digitized version of sound. Digital signals are reproduced from the compact disc by scanning its surface with a suitable source of light, typically, a laser beam.

Briefly, the scanning light beam (e. g. the laser) is focused just below the surface of the disc which, typically, is polished and may be, for example, aluminum. The laser beam is reflected from the surface of the disc and is modulated by the pits and lands which it scans. The modulated beam is detected; and the digital information represented by such modulation is decoded and converted to sound. By focusing the laser beam just below the surface of the disc, slight imperfections on the surface of the disc, such as scratches, neither cause nor affect the modulations in the reflected beam. Moreover, since no mechanical elements are brought into contact with the surface of the disc, the disc is not subjected to wear and, in theory, there is no practical limit on the number of times that disc may be replayed. This contrasts with typical contemporary phonograph systems in which a phonograph needle rides in a spiral groove of the phonograph disc resulting in wear on both the groove and the needle, as well as wear on the pick-up cartridge that is used with that needle, thereby limiting the longevity of the phonograph disc and pick-up transducer.

Notwithstanding the generally good resistance of the optically readable compact disc to sound distortion caused by imperfections in the surface of the disc, as aforementioned, perturbations may be imparted to the scanning laser beam, resulting in sound distortion, due to fingerprints, oil and soil adhering to the surface of the disc. Accordingly, it is a recognized objective to provide some form of cleaning apparatus by which the surface of the compact disc may be wiped to remove or at least reduce the aforementioned impairments from the disc. However, in view of the sensitivity of the disc to potential damage, devices that have been used heretofore in the cleaning of phonograph records cannot be used to clean compact discs. One proposal to clean the surface of the compact disc requires a user to manually wipe the surface of the disc with a hand-held cleaning pad subsequent to the application to that surface of a suitable cleaning spray. This cleaner is available from Nagaoka & Company from Japan.

However, such manual cleaning apparatus is less than perfect. Notwithstanding cautionary instructions that are provided therewith, it is expected that different users will manipulate the cleaning pad in different fashions, resulting in varied results, including the possibility of seriously damaging the compact disc. Also, although the manual cleaning of a compact disc does not appear to be an arduous task, it is expected that, in the absence of some automatic cleaning device, several users will wish not to be bothered with manual cleaning.

OBJECTS OF THE INVENTION

Therefore, it is an object of the present invention to provide an automatic cleaning apparatus for a compact disc.

Another object of this invention is to provide a compact disc cleaner which is simple to use, provides good results, will not damage the compact disc and provides quick and easy cleaning thereof.

A further object of this invention is to provide a mechanical cleaning arrangement for a compact disc which calls for minimal manual operation.

An additional object of this invention is to provide a motor-driven mechanical arrangement for cleaning a compact disc.

A yet further object of this invention is to provide a carrier supporting a cleaning pad which is separate and distinct from a drive wheel supporting a compact disc.

A still further object of the present invention is to provide a cleaning pad which rotates in the opposite direction of a compact disc to provide for maximum cleaning thereof.

Various other objects, advantages and features of the present invention will become readily apparent from the ensuing detailed description, and the novel features will be particularly pointed out in the appended claims.

SUMMARY OF THE INVENTION

In accordance with the invention, a cleaning apparatus is provided for a compact disc, the apparatus including a housing having a hingedly coupled base and cover, a drive-wheel disposed in the housing rotatably supporting the compact disc and having a first axis of rotation, a rotatable carrier fixed to the cover and having a second axis of rotation and further having a cleaning pad fastened thereto which is adapted to contact the surface of the compact disc to clean the same, and a drive element coupled to the drive wheel and carrier for driving the drive wheel and the carrier to rotate about their first and second axes of rotation, respectively, so that the drive wheel supporting the compact disc and the cleaning pad cleaning the compact disc rotate at approximately the same speed.

In one embodiment of this invention, the drive element is motor-driven; and in another embodiment, this drive element is manually driven.

As one aspect of the present invention, the cover is movable with respect to the base between open and closed positions, with the interior of the cover functioning to support the carrier and the cleaning pad secured thereto.

As another aspect of this invention, the drive element comprises a first gear coupled to the drive element and a second gear in meshing engagement with the first gear. The second gear is also in meshing engagement with a first external gear formed along the periphery of the drive wheel to rotate the drive wheel about its axis of rotation. A third gear is in meshing engagement with the second gear and also in meshing engagement with a second external gear formed along the periphery of the carrier to thereby rotate the carrier about its axis of rotation. In this manner, the cleaning pad and the compact disc rotate at approximately the same speed.

In the preferred embodiment of the present invention, the axis of rotation of the carrier is fastened at a fixed location radially outward of the axis of rotation of the drive wheel to provide for maximum cleaning of the compact disc by the cleaning pad.

BRIEF DESCRIPTION OF THE DRAWINGS

The following detailed description, given by way of example but not intended to limit the present invention solely to the specific embodiments described, may best be understood in conjunction with the accompanying drawings in which.

DETAILED DESCRIPTION OF CERTAIN PREFERRED EMBODIMENTS

Figure 1:
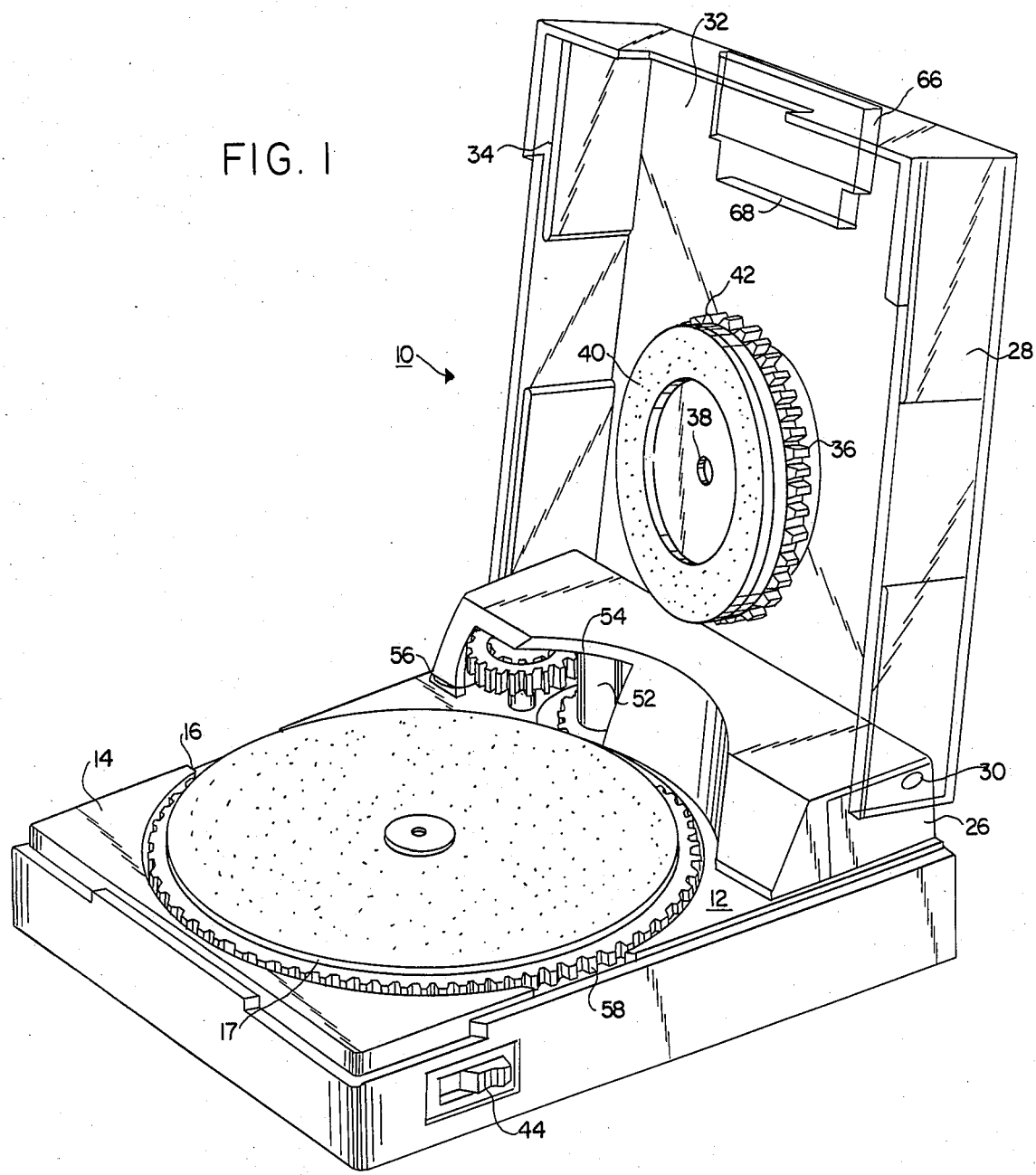
FIG. 1 is a perspective view of one embodiment of the cleaning apparatus in accordance with the present invention with the housing in its open position.

Referring now to the drawings, wherein like reference numerals are used throughout, and in particular to FIG. 1, there is illustrated a perspective view of one embodiment of the compact disc cleaner 10 in accordance with this invention. The compact disc cleaner is comprised of a housing 12 formed of a base 14 which includes a central, indented support table 16 for receiving a drive wheel 17 which supports a compact disc to be cleaned. A protectable padding 18 is attached to the upper surface of drive wheel 17 to protect the compact disc supported thereon. The bottom surface 19 of drive wheel 17 includes a depression 20 which is insertably received by a projection 22 extending upwardly from support table 16 to thereby releasably mount drive wheel 17 to the support table 16. This mounting of the drive wheel to the support table permits drive wheel 17 to freely rotate about its axis 24.

Figure 2:
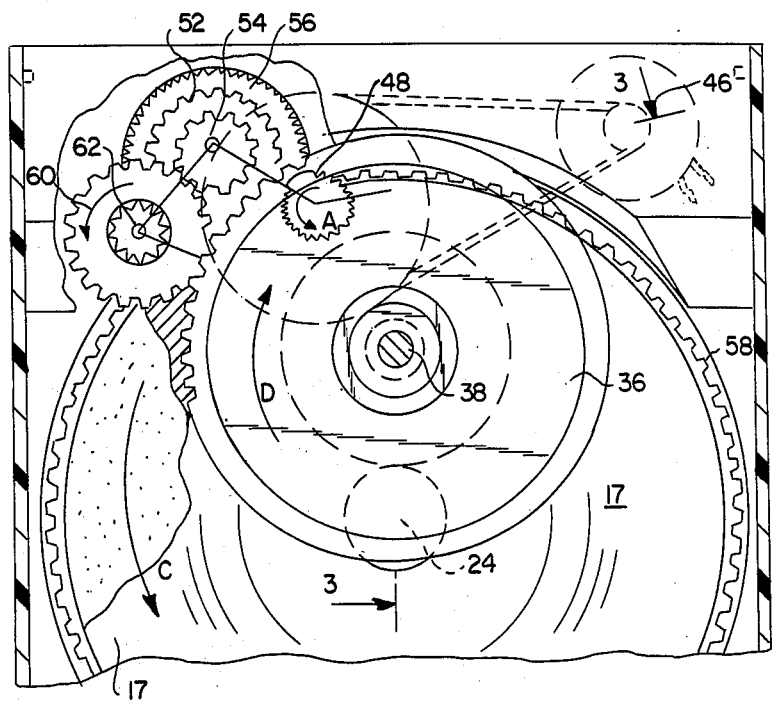
FIG. 2 is a front cross-sectional view of the cleaning apparatus when the housing is in its closed position.

Base 14 is provided with a curb 26 to which a cover 28 is hingedly fastened at hinge 30. It is appreciated, therefore, that cover 28 may pivot about hinge 30 between a closed position (FIG. 2), whereby cover 28 overlies base 14 and conceals the compact disc that can be supported on drive wheel 17 rotatably mounted within support table 16, and the open position illustrated in FIG. 1.

Cover 28 is provided with a peripheral frame 32 which provides a reasonably good dust-free environment within housing 12 when cover 28 is closed. Inner surface 34 of cover 28 mechanically supports a carrier 36 fastened at a fixed location thereto. Carrier 36 is rotatable about an axis of rotation 38. Axis 38 may be suitably fastened to cover 28 by conventional fastening means, such as a rivet, a screw, a pin, or the like. The precise construction of the fastening means is not critical to the present invention. Suffice it to say that it merely is necessary for the fastening of the carrier axis to the cover be of a type by which carrier 36 may freely rotate about its axis 38.

A replaceable cleaning pad 40 is removably secured to the bottom surface 42 of carrier 36 such that when cover 20 is closed (FIG. 2), cleaning pad 40 is brought into contact with the surface of the compact disc supported on drive wheel 17 mounted within support table 16. The cleaning pad may be formed of a chamois cloth or other suitable cleaning fabric.

In accordance with one of the general objects of this invention, the drive element disclosed herein provides for the rotation of drive wheel 17 and carrier 36 at approximately the same speed. This is accomplished only when the housing is in its closed position.

In the preferred embodiment, an on-off switch 44 actuates a battery-operated motor 46 which is mechanically linked to a first gear system 48 by means of a conventional drive belt arrangement 50. The first gear system 48 is mounted within base 14 below support table 16. First gear system 48 is in meshing engagement with a second gear system 52 which includes a smaller diameter gear 54 mounted above a larger diameter gear 56 which are unitarily rotatable. Larger diameter gear 56 is in meshing engagement with the mating teeth of an external gear 58 formed along the periphery of drive wheel 17, and therefore, the drive element of the present invention rotates drive wheel 17 about its axis of rotation 24. The smaller diameter gear 54 of second gear system 52 is in meshing engagement with a third gear system 60 supported substantially above the horizontal plane of the drive wheel 17 by a rotatable rod 62. When housing 12 is in its closed position, third gear system 60 is in meshing engagement with the mating teeth of an external gear 64 formed along the periphery of carrier 36. It can therefore be appreciated that when switch 44 is in the on-position, the compact disc and cleaning pad 40 will rotate at approximately the same speed.

As a result of this configuration, the carrier axis 38 is fixed to cover 28 at a radial location outwardly of the drive wheel axis of rotation 24 when housing 12 is in its closed position. This provides for maximum cleaning of the compact dice by cleaning pad 40 when housing 12 is closed and the switch is turned to the on-position.

Although the embodiments illustrated herein disclose an electric motor for rotation of the drive wheel and carrier 36, drive wheel 17 and carrier 36 can also be driven by a spring-wound motor, or the like. In addition, the first gear system 48 can be also coupled to a foldable crank (not shown) which can be manually grasped and rotated by the user thus rotating the drive wheel and carrier in the housing closed position.

Figure 3:
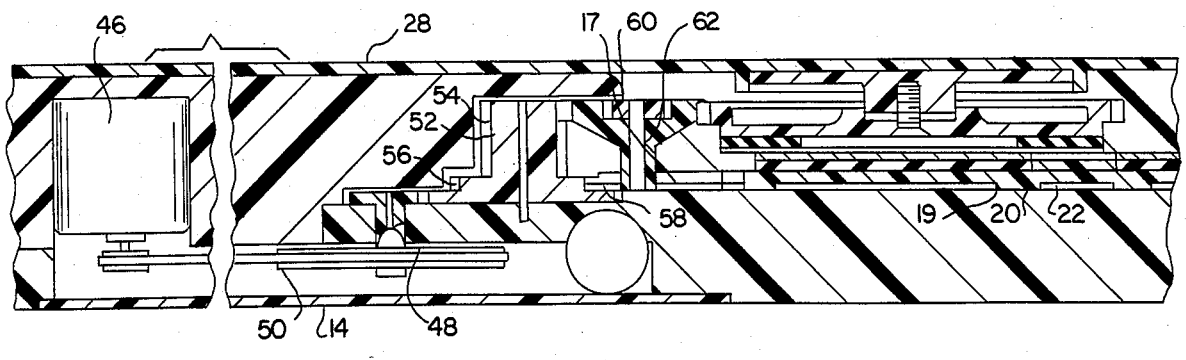
FIG. 3 is a top elevational view of the cleaning apparatus.

As best shown in FIG. 3, it will be appreciated that, when electric motor 44 is actuated, first gear system 48 rotates in a counterclockwise direction as represented by arrow A, thus forcing second gear system 52 to rotate in a clockwise direction as represented by arrow B. As a result thereof, the drive wheel supporting the compact disc to rotate in a counterclockwise direction as represented by arrow C. The third gear system 62 will also rotate in a counterclockwise direction as represented by arrow D, thereby providing a clockwise rotation to carrier 36 as represented by arrow E. As a result of the carrier and the drive wheel rotating in opposite directions, a greater force is applied by the cleaning pad 40 to the surface of the compact disc thus providing a more effective cleaning of the compact disc. It can be appreciated that the rotation of the gears can be reversed. The design of the present invention, however, provides a cleaning pad which rotates in the opposite direction from that of the compact disc regardless of the motor or drive element rotation of the gear system.

FIG. 1 also illustrates a storage compartment 66 provided in frame 32 of cover 28. This storage compartment serves as a receptacle in which a cleaning brush 68 is stored. The purpose of brush 68 is to clean the protective padding 18, and it is expected that the user of cleaner 10 will clean the protective padding from time to time to remove dust and other foreign particles therefrom. This improves the cleaning operation achieved by cleaning pad 40.

Although storage compartment 66 is illustrated herein as being provided in cover 28, it will be readily appreciated that, if desired, the storage compartment can be disposed at any suitable location in base 14. Furthermore, the storage compartment can be omitted, if desired, but it is preferred to provide brush 68, and this is readily achieved by the packaging illustrated herein.

While the present invention has been particularly shown and described with reference to various embodiments, it will be readily appreciated by those of ordinary skill in the art that various changes and modifications can be made without departing from the spirit and scope of the invention. For example, carrier 36 may be driven by means other than the third gear system 60, for instance a manual drive, a crank or other manually rotatable element may be provided mechanically secured to the carrier axis of rotation. A suitable motor and transmission may also be directly coupled to the carrier in place of the third gear system to provide rotation thereof.

It is intended that the appended claims will be interpreted as including the foregoing as well as other changes and modifications.

What is claimed is:

1. Cleaning apparatus for a compact disc comprising a housing having a hingedly coupled base and cover; a drive wheel disposed in the base of the housing and having a first axis of rotation rotatably supporting the compact disk, said drive wheel having external gear teeth; a rotatable carrier fixed to the cover and having a second axis of rotation, said rotatable carrier having external gear teeth and further having a cleaning pad fastened thereto which is adapted to contact the surface of the compact disk to clean the same; and drive means coupled to the wheel and the carrier for driving the drive wheel and the carrier to rotate about their first and second axes of rotation, respectively, so that the drive wheel supporting the compact disk and the cleaning pad cleaning the compact disk rotate at approximately the same speed; said drive means including a first gear system having first and second unitarily rotatable gear means and also including means to drive said first gear system, the first gear means being in direct meshing engagement with the external gear teeth of said drive wheel to rotate the drive wheel in a first direction, and a second gear system having third and fourth unitarily rotatable gear means, the third gear means being in direct meshing engagement with the second gear means and the fourth gear means being in direct meshing engagement with the external gear teeth of said carrier to rotate the carrier in a second direction opposite to said first direction.

2. The cleaning apparatus of claim 1 wherein the cover is movable with respect to the base between open and closed positions; and wherein the carrier and cleaning pad are supported by and movable with the cover.

3. The cleaning apparatus of claim 1 wherein the housing further includes a storage compartment provided in the base; and a cleaning brush stored in the storage compartment and accessible by a user for removal from the storage compartment.

4. The cleaning apparatus of claim 1 wherein the housing further includes a storage compartment provided in the cover; and a cleaning brush stored in the storage compartment and accessible by a user for removal from the storage compartment.

5. The cleaning apparatus of claim 1 wherein the drive means is manually operated.

6. The cleansing apparatus of claim 1 and further including means for fastening the second axis of rotation of the carrier at a fixed location radially outward of the first axis of rotation of the drive wheel to provide maximum cleaning of the compact disc by the cleaning pad.

7. The cleaning apparatus of claim 1 wherein the carrier having the cleaning pad fastened thereto is separate and distinct from the drive wheel supporting the compact disc.

* * * * *